United States Patent [19]

Hanson et al.

[11] 4,139,070
[45] Feb. 13, 1979

[54] DUAL PLATFORM COUNTING SCALE

[75] Inventors: Harlan B. Hanson; Frank C. Rock, both of Santa Rosa, Calif.

[73] Assignee: National Controls, Inc., Santa Rosa, Calif.

[21] Appl. No.: 722,058

[22] Filed: Sep. 10, 1976

[51] Int. Cl.² .......................................... G01G 19/00
[52] U.S. Cl. ..................................... 177/200; 177/25; 364/567
[58] Field of Search .................. 177/200, 199, 25, 30; 364/567

[56] References Cited

U.S. PATENT DOCUMENTS

| | | | |
|---|---|---|---|
| 3,552,511 | 1/1971 | Marcheso | 177/200 X |
| 3,557,891 | 1/1977 | Klopenstein | 177/200 X |
| 3,716,706 | 1/1973 | Gray | 177/200 X |
| 3,831,687 | 5/1972 | Maffia | 177/210 |
| 3,951,221 | 4/1976 | Rock | 177/25 X |
| 4,014,397 | 3/1977 | Langeuin | 177/200 |
| 4,043,412 | 8/1977 | Rock | 177/200 X |

*Primary Examiner*—Joseph W. Hartary
*Attorney, Agent, or Firm*—Flehr, Hohbach, Test, Albritton & Herbert

[57] ABSTRACT

Counting scale utilizing two platforms connected to a single load cell for determining the weights of a sample and an unknown quantity of articles to be counted. The weights are combined to determine the number of articles, and this number is displayed. One of the platforms is connected directly to the load cell and is particularly suitable for weighing small loads. The other platform is connected to the load cell through a lever system and is particularly suitable for larger loads. Depending upon the size and the number of the articles to be counted, either of the platforms can be used for weighing either the unknown quantity or the sample, or both. A keyboard is included for entering a weight such as the weight of a container so that the weight of a group of parts in a container upon one of the platforms can be determined without removing the parts and weighing the container separately.

7 Claims, 5 Drawing Figures

# DUAL PLATFORM COUNTING SCALE

BACKGROUND OF THE INVENTION

This invention pertains generally to weighing instruments and more particularly to a counting scale for determining the number of articles in a group from the weight of the articles.

Heretofore, digital counting scales have been provided for determining the number of articles in a group by first weighing a known quantity or sample of articles to determine the unit weight, then weighing the group and dividing the group weight by the unit weight to determine the count. Systems utilized in the past for this purpose have generally been one of two types: systems utilizing a single scale for both weighings and systems utilizing a low capacity scale for weighing the sample and a high capacity scale for weighing the unknown quantity.

Both types of systems are subject to certain problems and disadvantages. The single scale systems are generally limited to a relatively small number of articles since they do not have both the resolution required to accurately weigh a small sample and the range or capacity required to weigh a large load. Dual scale systems generally have a greater range, but the two scales can be awkward to use and difficult to calibrate with sufficient accuracy to provide satisfactory results. Proper calibration is particularly difficult with electronic scales utilizing load cells and amplifiers which generally exhibit some non-linearities in practice.

SUMMARY AND OBJECTS OF THE INVENTION

The invention provides a counting scale utilizing two platforms connected to a single load cell to provide both a wide range and a high degree of accuracy. One of the platforms is connected directly to the load cell and is particularly suitable for weighing small loads. The other platform is connected to the load cell through a lever system and is particularly suitable for larger loads. Depending upon the size and the number of articles to be counted, either of the platforms can be used for weighing either the unknown quantity or the sample, or both. A keyboard is included for entering a weight such as the weight of a container so that the weight of a group of parts in a container on one of the platforms can be determined without removing the parts and weighing the container separately.

It is in general an object of the invention to provide a new and improved counting scale for determining the number of articles in a group from the weight of the articles.

Another object of the invention is to provide a counting scale of the above character utilizing two platforms connected to a single load cell.

Another object of the invention is to provide a counting scale of the above character having means for manual entry of a weight to be subtracted such as the weight of a container holding the parts to be counted on one of the platforms.

Additional objects and features of the invention will be apparent from the following description in which the preferred embodiment is set forth in detail in conjunction with the accompanying drawings.

DESCRIPTION OF THE PREFERRED EMBODIMENTS

Figure 1:
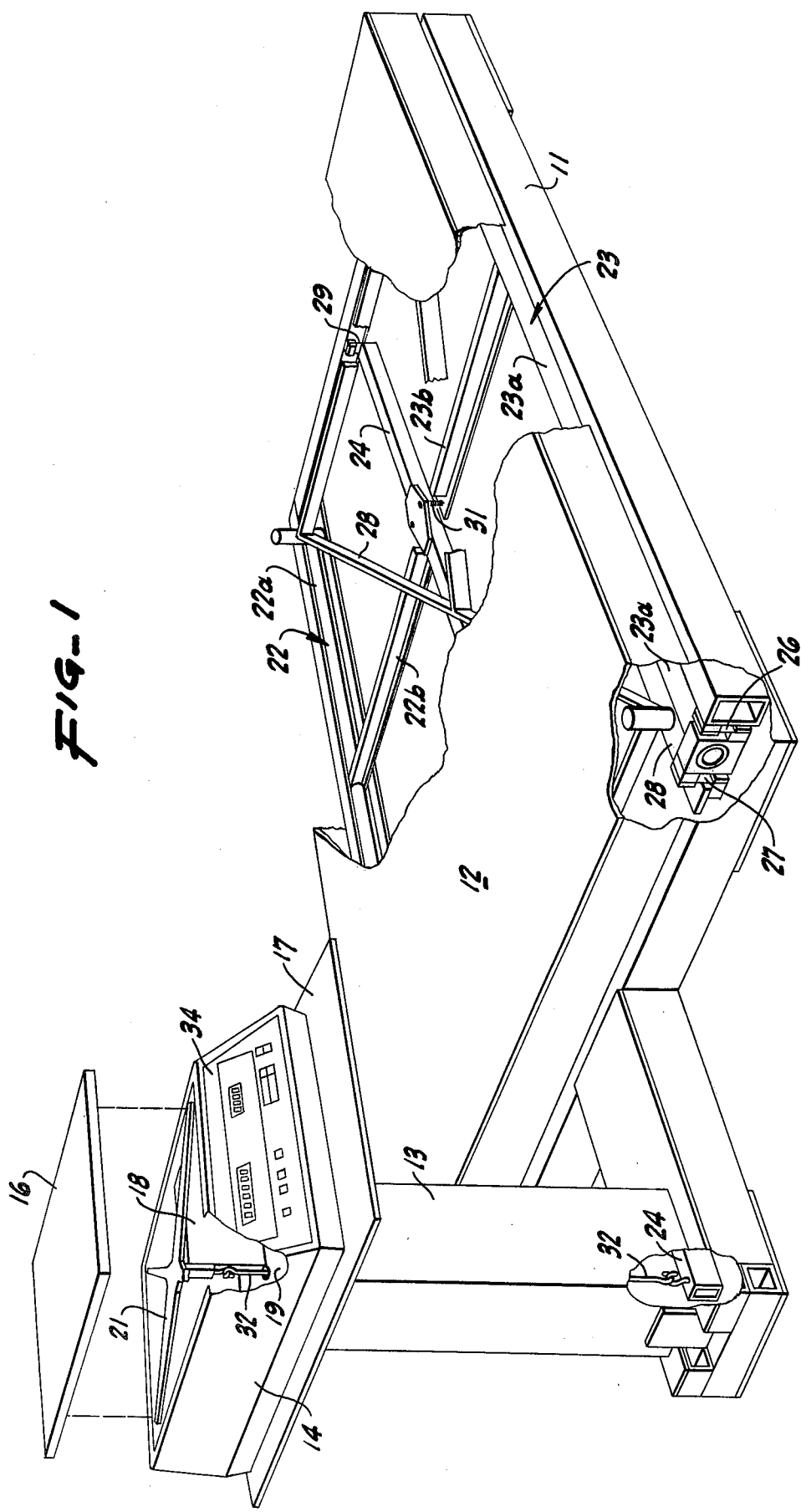
FIG. 1 is a perspective view, partially exploded and partially broken away, of one embodiment of a dual platform counting scale incorporating the invention.

As illustrated in FIG. 1, the counting scale includes a base 11 on which a first load receiving platform 12 is mounted. An upright column 13 is provided toward one side of the base, and a console 14 having a second load receiving platform 16 is mounted on a shelf 17 at the upper end of the column. Platform 16 is mounted upon and supported by a load cell 18 which produces an output signal corresponding to the force applied thereto. Suitable load cells are described in U.S. Pat. No. 3,951,221, issued Apr. 20, 1976, and in co-pending application Ser. No. 727,981, filed Sept. 10, 1976. The load cell is mounted on the bottom wall or base 19 of the console, and platform 19 rests upon a load spider 21 affixed to the load cell.

Platform 12 is mounted on base 11 by means of a lever system including main levers 22, 23 and an output lever 24. The mains levers include pivot heads 22a, 23a which extend along opposite sides of the base and arms 22b, 23b which extend inwardly from the pivot heads toward the center line of the base. The levers are mounted on the base by fulcrum flexure plates 26 connected to the base and the pivot heads. The platform is connected to the levers by load flexure plates 27 which extend between the pivot heads and a spider 28 on which the platform rests.

Output lever 24 extends along the center line of the base and is pivotally mounted at one end to the base by means of a flexure plate 29. The inner ends of lever arms 22b, 23b are connected to the output lever by flexible cables 31, and the free end of the output lever is connected to load cell 18 by a steelyard rod 32.

Briefly, the application of a load to platform 12 produces a downwardly directed force in lever arms 22b, 23b which is transmitted to output lever 24 by cables 31. This produces a downward force at the free end of the output lever which is applied to the load cell by the steelyard rod. Thus, the output signal produced by the load cell corresponds to the combined weights applied to platforms 12 and 16. Since the forces produced at the load cell by loads on platform 12 are reduced by the lever ratio of the system, whereas the loads on platform 16 are applied directly to the load cell, platform 12 has a larger load handling capacity than platform 16. In one presently preferred embodiment, the small platform and the load cell have a capacity of 50 pounds, the lever ratio is 20:1, and the large platform has a capacity of 1000 pounds. In another preferred embodiment, the small platform and load cell have a capacity of 100 pounds, the lever ratio is 50:1, and the large platform has a capacity of 5000 pounds.

Figure 2:
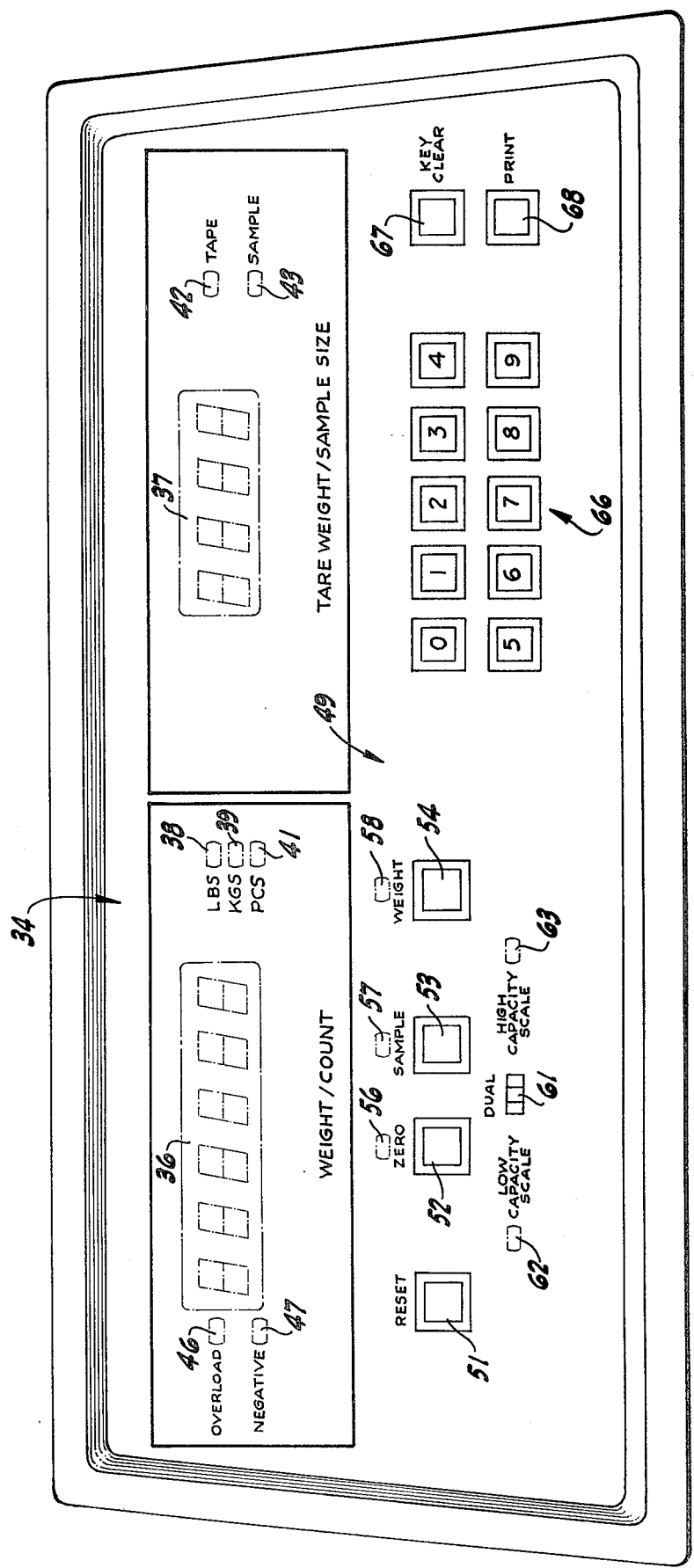
FIG. 2 is an enlarged front elevational view of the control panel of the counting scale of FIG. 1.

A control panel 34 is provided at the front of console 14. This panel is illustrated in detail in FIG. 2 and includes a WEIGHT/COUNT display 36 and a TARE WEIGHT/SAMPLE SIZE display 37. Lamps 38, 39 and 41 are mounted to the right of display 36 to indicate whether the reading on the display is a weight reading or a parts count. For a weight reading, lamps 38, 39 indicate the units of weight, e.g. pounds or kilograms, and when lamp 41 is illuminated, the reading represents the number of articles or pieces on the scale. Similarily, lamps 42, 43 are mounted adjacent to display 37 to indicate whether a reading on that display is a tare weight or a sample size. Additional lamps 46, 47 are mounted to the left of display 36 to indicate an overload condition or a negative reading on the display.

A keyboard 49 comprising switches and keys for controlling the operation of the scale is included on the control panel below the displays. The keys include a RESET key 51, a ZERO key 52, a SAMPLE key 53 and a WEIGHT key 54 which actuate pushbutton switches mounted behind the panel. Lamps 56–58 are provided to indicate when keys 52–54 have been pushed. A MODE switch 61 permits the scale to be utilized selectively as either a low capacity scale in which both a sample and the unknown quantity are placed on the small platform, a high capacity scale in which both the sample and the unknown quantity are placed on the large platform, or a dual capacity scale in which the sample is placed on the small platform and the unknown quantity is placed on the large platform. Lamps 62, 63 are provided to indicate when the scale is operating in the high or low capacity mode.

Ten digital keys are mounted below the TARE WEIGHT/SAMPLE size display to enable an operator to enter a tare weight or sample size. A CLEAR key 67 permits the keyboard entry to be cleared, and a PRINT key 68 is provided below the CLEAR key.

Figure 3:
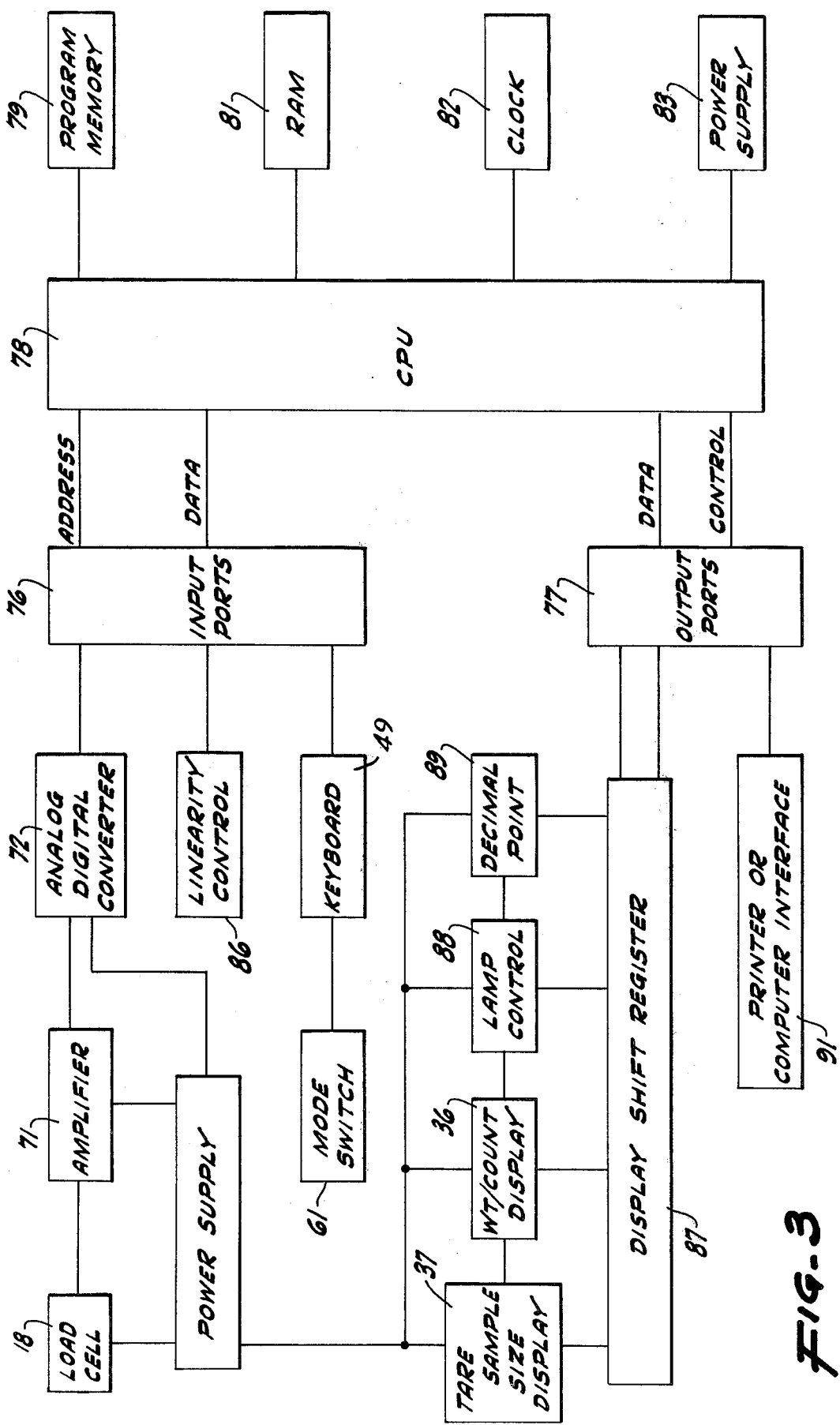
FIG. 3 is a block diagram of the computing system of the counting scale of FIG. 1.

Referring now to FIG. 3, the output signal from load cell 18 is applied to an amplifier 71 and then to an analog-to-digital converter 72. The A/D converter is of known design and serves to convert the analog signal from the load cell and amplifier to binary signals at a suitable clock rate such as 15 times per second.

Means is provided for processing the signals from A/D converter 72 to determine the weight and number of articles on the platforms. This means includes a microprocessor comprising input ports 76, output ports 77, a central processing unit 78, a program memory 79, a random access memory 81, a clock 82 and a power supply 83. The output signals from converter 72 and signals from mode switch 61 and keyboard 49 are applied to the microprocessor through input ports 76. A linearity control 76 is also connected to the microprocessor through input ports 76 for use in calibrating the system.

Displays 36, 37 receive output signals from the microprocessor through output ports 77 and a shift register 87. Signals from the microprocessor for controlling the illumination of the indicator lamps on the panel are applied to a lamp control 88 by the shift register, and signals for positioning decimal points in the displays are applied to a decimal point control 89. The microprocessor is connected to a printer 91 or other external equipment through output ports 77. Depressing PRINT key 68 causes the current weight or count reading to be transferred to the external device.

Figure 4:
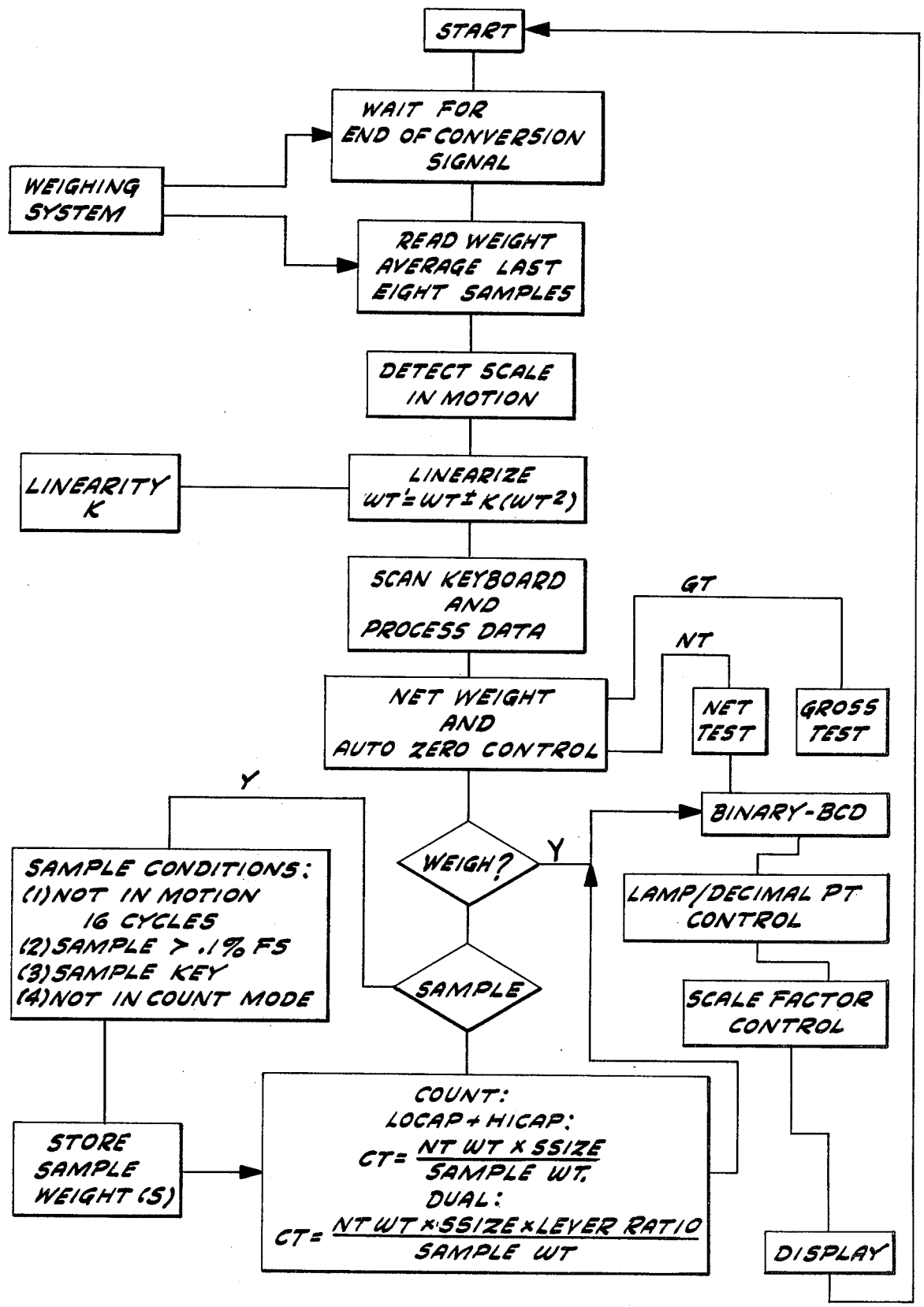
FIG. 4 is a flow chart of a program for determining weights and the number of articles in an unknown quantity on the scale of FIG. 1.
Figure 5:
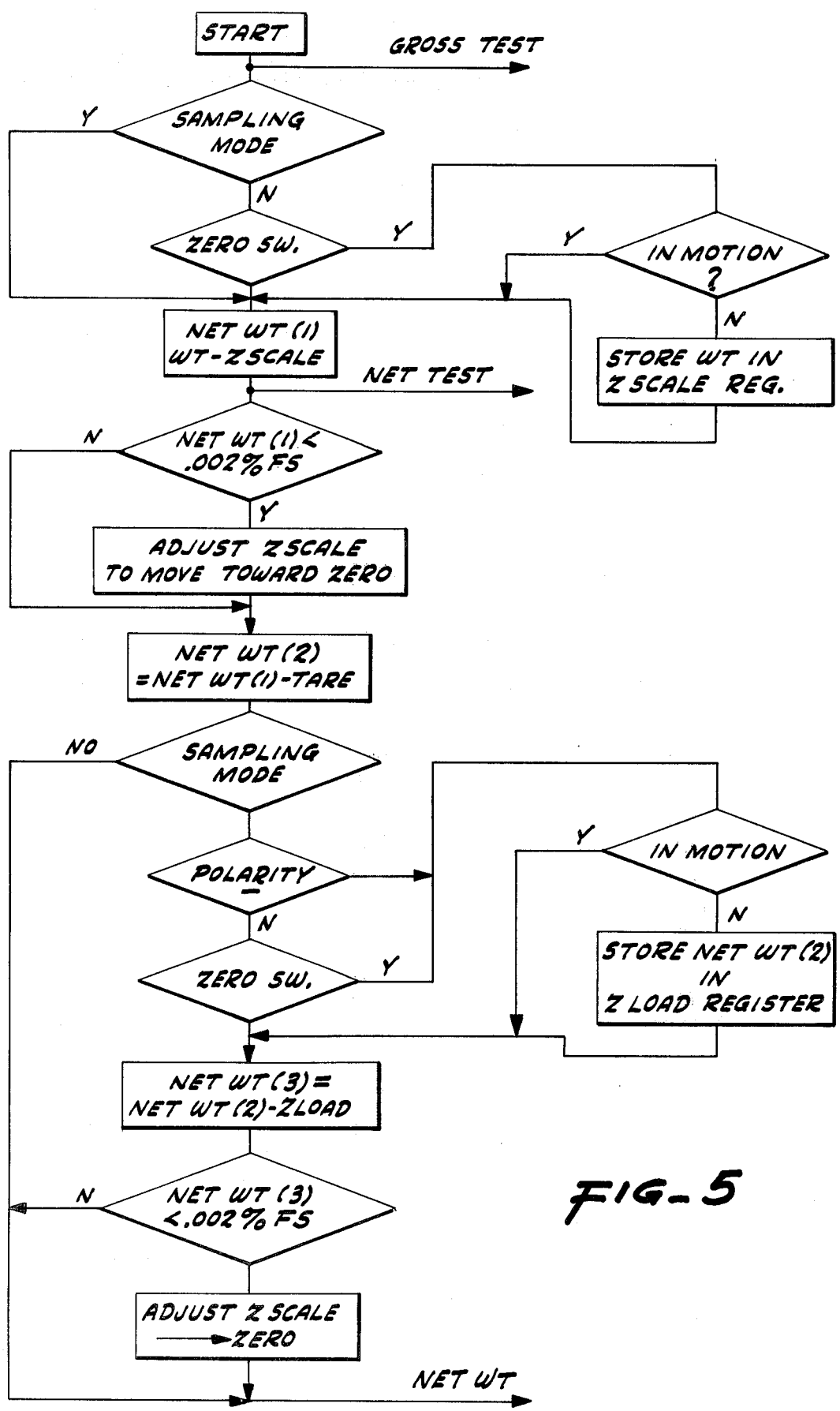
FIG. 5 is a flow chart of a program for determining net weights and maintaining an accurate zero reference in the scale of FIG. 1.

The flow charts of FIGS. 4 and 5 illustrate the manner in which weight readings are made and the number of articles on the scale is determined. After conversion to binary form in converter 72, the load cell signals are read into the microprocessor where they are averaged. The averaging is done by storing the eight most recent weight readings in a weight register in random access memory 81, with the most recent reading replacing the oldest reading in the register. The stored readings are averaged each time a new reading is taken to provide a moving average of the weight readings. This averaging technique is described in detail in U.S. Pat. No. 3,951,221, issued Apr. 20, 1976, and in co-pending application Ser. No. 668,855, filed Mar. 22, 1976, now U.S. Pat. No. 4,043,412.

The averaged weight readings are checked to determine if one of the platforms is in motion, and if there is no motion, the keyboard is scanned to determine the manner in which the weight and other input data is to be processed.

The scale has three modes of operation: (1) and initial mode to which the scale can be returned by depressing RESET key 51, (2) a sampling mode which is selected by depressing SAMPLE key 53 and (3) a counting mode which is initiated by placing a sample of parts or other articles to be counted on one of the platforms.

After the keyboard has been scanned, the weight signal is processed in the manner illustrated in FIG. 5 to provide net weight signals and maintain an accurate zero reference. When ZERO switch 52 is depressed and the scale is not in the sampling mode or in motion, the average weight signal WT is stored as a zero reference signal Z SCALE in a register in RAM 81. The stored Z SCALE signal is subtracted from the gross weight signal WT to provide a net weight signal NET WT (1). If the scale is in the sampling mode or if the zero switch is not depressed, the Z SCALE signal is unchanged, and the previously stored signal is subtracted to determine the net weight.

The net weight is checked during each counting cycle, and in the absence of a load, it is increased or decreased in small increments to maintain an accurate zero reference. In the embodiment illustrated, the net weight is adjusted by increasing or decreasing the Z SCALE signal when the absolute value of NET WT (1) is less than a predetermined level such as 0.002% of full scale. The Z SCALE signal is increased or decreased by one increment, e.g. 1/16th of 0.001% of full scale, during each counting cycle. If the absolute value of the net weight is greater than 0.002% of full scale, it is assumed that there is a load on the scale, and no adjustment of the net weight is made.

Following the adjustment of the net weight signal, if any, the tare weight entered through keys 66 is subtracted from NET WT (1) to provide a second net weight signal NET WT (2).

When the scale is in the sampling mode and ZERO switch 62 is depressed or the polarity of NET WT (2) is negative, the current value of NET WT (2) is stored as a zero reference signal Z LOAD in a register in RAM 81. The signal stored in this register is subtracted from NET WT (2) to provide a third net weight signal NET WT (3). If the scale is not in the sampling mode, Z LOAD is not subtracted from NET WT (2), and the previously stored value of NET WT (2) becomes the output NET WT. Likewise, the value of Z LOAD is not changed if the polarity of NET WT (2) is positive and if the ZERO switch is not depressed while the scale is in the sampling mode. If the scale is in motion, Z LOAD is unchanged regardless of the polarity of NET WT (2) or the condition of the ZERO switch.

The NET WT (3) signal is adjusted to maintain an accurate zero reference in the manner described in connection with NET WT (1).

If the weight key 54 is depressed, the output NET WT signal is converted to binary coded decimal form and applied to display 36. If SAMPLE key 53 is depressed, the output NET WT signal is stored as a sample weight if certain conditions are met. These conditions require that the scale not be in motion for 16 successive cycles, the net weight be greater than 0.1% of full scale, and the scale not be in the count mode. If the SAMPLE key is not depressed, the sample weight remains unchanged, and the previously stored sample weight is used in determining the count.

When the scale is operating in either the low capacity mode or the high capacity mode, the count is determined by the following relationship:

$$\text{COUNT} = \frac{\text{NET WT} \times \text{SAMPLE SIZE}}{\text{SAMPLE WEIGHT}}.$$

For the dual counting mode in which both platforms are used, the count is determined by the following relationship:

$$\text{COUNT} = \frac{\text{NET WT} \times \text{SAMPLE SIZE} \times \text{LEVER RATIO}}{\text{SAMPLE WEIGHT}}.$$

Following the computation, the count signal is converted from binary to binary coded decimal form and applied to the display.

Operation and use of the counting scale can now be described. Initially, it is assumed that 200,000 parts each weighing 0.005 pound are to be counted in a container weighing 200 pounds with the scale in the dual counting mode. At the outset, RESET button 51 is depressed to return the scale to the initial state. ZERO switch 52 is depressed to eliminate any residual weight readings, and the container of parts is placed on platform 12. Display 36 now reads 1200, and lamp 38 is illuminated to indicate that the display is reading in units of pounds. The tare weight of the container is entered through keys 66 and displayed by display 37 which now reads 200, with TARE lamp 42 illuminated. As the tare weight is entered, it is subtracted from the weight previously displayed by display 36, and the net weight of 1000 pounds is now displayed and stored.

The sampling mode is initiated by depressing SAMPLE key 53, which causes display 36 to read "Add XX", with XX represents the number of parts constituting the sample. This number is stored and during the sample mode can be changed by entering a new sample size through keys 66. The sample size is displayed by display 37, and SAMPLE lamp 43 is illuminated. For a sample of ten parts, for example, the operator would enter the number 10, and this number would be displayed by both display 36 and display 37. The scale remains in the sample mode until the sample is placed on platform 16.

Next assume that a sample of ten parts is removed from the container on platform 12. Display 36 reads "Add 10" until the sample is placed on platform 16 and accepted by the scale. When the sample is accepted, the scale shifts to the counting mode, and displays 36 and 37 both show the number of parts on platform 16. If parts are added to or removed from this platform, display 36 will change accordingly, but display 37 will continue to show the sample size of 10. When all the parts are removed from the small platform, the system detects a net weight of zero and goes into a counting mode utilizing the large platform. Display 36 now reads 199,990, the number of parts in the container on the big platform. As parts are added to or removed from the container, display 36 changes accordingly. If the sample of ten parts is replaced in the container, the reading will become 200,000.

If ZERO button 52 is depressed while the scale is in the counting mode, the number of parts then on the big platform will be subtracted from subsequent readings, and the display will correspond to net changes in the parts count. By depressing the ZERO button during the initial mode, a weight such as the tare weight of a container on one of the platforms can be subtracted from the net weight. Depressing the ZERO switch when the scale is in sample mode causes the weight of the sample to be subtracted without affecting the zero reference Z SCALE. This permits the zero reference for the sample to be changed without disturbing the zero reference for the system.

Operation and use of the scale in the low capacity and high capacity modes is generally similar to that described above except that both the sample and the unknown quantity of parts are weighed on the same platform. The desired capacity is selected by mode switch 61, and RESET button 51 is depressed to return the scale to the initial condition. ZERO button 52 is depressed, and if the parts are to be weighed in a container, the weight of the container is subtracted either by placing the container on the platform and pressing the ZERO button again or by entering the tare weight through keys 66 with the scale in the initial mode. The sample mode is initiated by depressing SAMPLE key 53, following which display 36 will read "Add XX", and display 37 will show the sample size. The sampling mode continues until the sample is placed on the platform and accepted by the scale. Once the sample is accepted, display 36 indicates the number of parts on the platform, while display 37 continues to show the sample size. As parts are added to or removed from the platform, display 36 changes accordingly. If WEIGHT button 54 is depressed during the counting mode, display 36 will show the weight of the parts on the platform.

The invention has a number of important features and advantages. In the low capacity mode, the system permits small quantities of small parts to be counted with high resolution. In the high capacity mode, quantities of larger parts can be counted. In the dual mode, the scale has the advantages of a two-scale counting system in that the piece weight of small parts can be accurately determined on the small platform, while large numbers of parts can be counted on the large platform. The disadvantages of two-scale systems are eliminated since the same load cell and electronic circuitry are utilized for both platforms. Tare weights can be subtracted either by entry through the keyboard or by placing the empty container on one of the platforms. The keyboard entry is particularly useful with heavy containers and containers holding a large number of parts.

It is apparent from the foregoing that a new and improved counting scale has been provided. While only one presently preferred embodiment has been described, as will be apparent to those familiar with the art, certain changes and modifications can be made without departing from the scope of the invention as defined by the following claims.

What is claimed is:

1. In a counting scale for determining the number of articles in a load: first and second platforms, a load cell connected to the platforms for delivering signals corresponding to the loads applied thereto, means responsive to the load cell signals for storing a signal corresponding to a sample on one of the platforms, said sample consisting of a predetermined number of the articles to be counted, means for combining the stored signal with the load cell signals to determine the number of articles in the load in either a first mode of operation in which both the sample and the load to be counted are placed on the first platform, a second mode in which the sample and load are both placed on the second platform, or a third mode in which the sample is placed on the first platform and the load is placed on the second platform, and means connected to the last named means for selectively conditioning said means for operation in the first, second or third mode.

2. The counting scale of claim 1 further including keyboard means for manually providing a signal representative of the sample size for use in combination with the load cell signals in determining the number of articles in the load.

3. The counting scale of claim 1 wherein one of the platforms is mounted on and supported by the load cell.

4. The counting scale of claim 1 wherein the means for combining the signals comprises a microprocessor.

5. The counting scale of claim 1 further including means for combining a signal representative of tare weight with the stored signal and the load cell signal to effect subtraction of the tarr weight.

6. The counting scale of claim 5 including manually operable digital input means for providing the tare weight signal.

7. The counting scale of claim 1 further including digital display means responsive to the means for combining the signals for indicating the number of articles in the load.

* * * * *